United States Patent [19]

Boze et al.

[11] Patent Number: 4,943,379

[45] Date of Patent: * Jul. 24, 1990

[54] APPARATUS AND PROCESS FOR FILTERING FLUIDS

[76] Inventors: Ronald A. Boze, 19 Wisteria La., Covington, La. 70433; Theodore A. Warning, 11227 Rippling Meadow, Houston, Tex. 77064

[*] Notice: The portion of the term of this patent subsequent to Oct. 17, 2006 has been disclaimed.

[21] Appl. No.: 361,242

[22] Filed: Jun. 5, 1989

Related U.S. Application Data

[63] Continuation of Ser. No. 96,634, Sep. 14, 1987, Pat. No. 4,874,533.

[51] Int. Cl.$^5$ .............................................. B01D 37/02
[52] U.S. Cl. ..................................... 210/778; 210/798; 210/411
[58] Field of Search ................. 210/777, 778, 793–795, 210/798, 90, 108, 323.2, 333.01, 333.1, 341, 356, 410–412

[56] References Cited

U.S. PATENT DOCUMENTS 2,569,748 10/1951 De Grave .............................. 210/90
4,055,500 10/1977 Parker ................................... 210/412

FOREIGN PATENT DOCUMENTS 755243 8/1956 United Kingdom ................ 210/410

*Primary Examiner*—Ivars Cintins
*Attorney, Agent, or Firm*—Thomas S. Keaty

[57] ABSTRACT

An apparatus and process of filtering fluids, such as white water is provided for use in the place of an existing save-all device or downstream of an existing save-all device at a paper-making mill. The white water having contaminants in a suspended state is introduced into the filtration vessel and is withdrawn from the interior of the filter element positioned within the filtration vessel. To clean the filter element from the cake which has built up on the exterior surface of the filter element, a backflushing shock is applied to the interior of the filter element, forcing all cake settled on the exterior to be dislodged, thereby cleaning the filter element. The backflushing shock is delivered from a backflushing reservoir wherein the backflushing fluid is contained under pressure at a level at least slightly above the level of a pressure differential which has built up across the filter element. The shock is applied for a period of 1-2 seconds, during which time the backflush reservoir is emptied.

14 Claims, 3 Drawing Sheets

APPARATUS AND PROCESS FOR FILTERING FLUIDS

This application is a continuation application of our co-pending application Ser. No. 096,634 filed Sept. 14, 1987 entitled "Apparatus and Process for Filtering Fluids", now U.S. Pat. No. 4,874,533, the disclosure of which is incorporated by reference herein.

BACKGROUND OF THE INVENTION

1. Field of the Invention

The apparatus and process of the present invention relate to filtration of fluids and more specifically to filtering or straining of fluids which are found in the paper making industry.

Paper is made of cellulose fibers. The primary source of cellulose fibers is the wood of trees. The first step in the paper making process is referred to as pulping. Pulping consists of breaking wood into its components, cellulose and lignin, either by mechanical means, such as grinding in which case the resulting pulp is referred as ground wood pulp.

The chemical pulping process consists of cooking wood chips in a pressure cooker at approximately 100 psi pressure for a period of about one hour to dissolve the lignin. Cooking liquors include sodium hydroxide and sodium sulfide in the kraft process or a liquor calcium bisulfite solution in the sulfite process. After the wood is cooked, it is blown from the digestor resulting in a pulp mass. This mass is then washed to remove the residual cooking liquors and chemicals. If the pulp is to be used to make white paper, for example, for writing or printing, the pulp is then bleached using chemicals such as chlorine and chlorine dioxide or calcium hypochlorite to bring the whiteness of the pulp to a suitable degree. In all of the pulping, bleaching and washing processes, vacuum filters are used with an attempt to retain the pulp and wash out the undesirable materials. A considerable amount of the chemicals and finer fiber particles pass through these washer filter screens and contend to be problems in the process.

Ground pulp is generally made from spruce wood and is principly used in making newsprint paper. It is usually mixed with some chemically prepared pulp so that the paper may have greater strength and resist tearing in handling.

The desirable pulp product is then converted into paper by first mechanically treating it in order to effect the end product-paper-strength properties. The paper making process consists of slurrying the pulp in a suspension of approximately 1 part pulp fiber to 200 parts water then discharging this slurry onto a rotating fine screen continuous endless belt, referred to as a forming fabric. Vibration is applied to the screen to spread the material in a thin uniform layer. The water drains through the fabric and the fibers are retained to form a sheet which is subsequently pressed through ring-type rollers and steam dried to remove water.

It is apparent that when the soft mass is carried by the screen, not all of the fiber and other solid materials can be retained by the forming wire and the smaller particles will penetrate through the wire mesh along with the water which is drained. As a result, the so called "white water" is collected during the sheet forming process and is recirculated in the overall system. A large part of the "white water" is added directly to the stuff to be recirculated, while a small portion of it goes into a save-all device which intends to recover much of the solids from the "white water".

In the paper making process, varous additives including dyes and also pigments such as kaolin clay, calcium carbonate and titanium dioxide are added to give the paper the needed end product properties for printing and writing. All of these additive materials are very expensive and recovery of them is economically attractive. Moreoever, these additive materials, if not recovered, constitute an excess cost of effluent treatment. Thus, the paper industry faces a number of problems which should lend themselves to filtration devices or other means of separating liquid and solids. In some cases, the desirable effect is merely to clean the water so that it can be reused or to decrease the amount of water required in order to make a ton of paper. In other cases, the economic or technical motivation is to save or retain the fiber and non-fibrous paper making raw materials to obtain economic benefit or to minimize the problems with the need to remove them from process waters in an effluent treatment plant to prevent pollution.

Over the past several decades, a number of devices, commonly referred to as "save-alls" have been used. There are three basic types of save-alls: the filtration-type save-all is either a gravity or vacuum-aided filter, wherein the white water from the mill is run across a filter and an attempt is used to retain the fiber and filler or non-fibrous materials wherein the water flows through and is clarified. The second type of save-all is a flotation-type save-all. In this case, water is premixed with a flocculent and/or adhesive which is most commonly a polyelectrolyte synthetic polymer. The polymer flocculated material is charged with air in order to make it float and the save-all device consists of a skimming device to take the floating mass of pulp fibers and other non-fibrous materials off, whereas the clearer water settles and is taken off by a well-type device. The third type of save-all is a sedimentation save-all or clarifier, wherein white water treated with a flocculent is allowed to settle and the clearer material is taken off of the top and the richer settled material is taken and returned to the process off of the bottom. All three types of save-alls have generally shown capabilities in a normal operating system when properly designed to clarify water to approximately 10-20 parts per million.

Major problems occur with process upsets which will overload the save-all and cause the water outflow from the save-all to contain as much as 60-100 parts per million of fiber and water. This places severe restrictions on how the water may be used. For example, water with the type of contaminant that has filler material in it cannot be used as water on pumps or agitators because the inclusion of the abrasive material would ruin the equipment. Water with more than about 10 parts per million of suspended solids is not practical for use in machine showers and other applications because it would plug the showers and cause the process an economic loss to the paper making proces. It has been well known for a number of years that the industry has had a need for a reliable device to consistently clarify water down to levels of 10 parts per million or less of suspended solids to remove or stop the inclusion of filler materials which are abrasive and prevent the water from being re-used and to save the fiber and get its economic value.

In a typical mill running 500 tons a day of paper, the amount of fiber and filler that may be lost to the sewer and subsequently need to be treated may run 5 to 15 tons a day in common application, in a system that is using the best available save-all devices.

Water is the medium which is mostly used in the paper industry to convey the pulp and its various additives. In many cases, as much as 200 times as much water is used as fiber and the necessity to recover the most amount of water and make it suitable for recirculation becomes more important in today's industry.

In addition to the necessity to save the fiber, chemical additives and water, one more aspect must be considered: environmental impact of disposal of the water derived from the paper making process.

As was indicated above, the currently used save-all devices do not accomplish the purpose of complete cleaning of white water with a suitable separation of fiber, other solids and water.

It is therefore a customary practice to place another filtration device downstream from the save-all devices, also with the purpose of recovering as much fiber and solids as possible, thereby rendering the water reclaimed from the filtering apparatus more suitable for recirculation.

Additionally, a number of chemicals which are utilized in the paper making process are costly and their reclamation becomes important in view of the quantity of the chemicals added to the pulp and then screened away as white water.

Over the years, a number of devices have been used which are capable of clarifying water to the required level. For example, a common plate and frame filter could be used. However, it is not economically feasible to use this device because of the required amount of man power and the frequency of cleaning required. Other attempts have been used to use various types of pre-coat filters. While these are satisfactory in filtration, there has never been a proven reliable device that does not require manual cleaning usually on a basis of at least once or twice a day and sometimes as often as once an hour. While these devices would be technologically feasible, the required frequency of cleaning have made them economically unfeasible. Another problem with the requirement manual cleaning of filters is the fact that it is common for the process waters and paper mills to run relatively hot, for example, the 150°-180° F. range, there have been numerous instances of injuries in the industry including severe scalding and burning when employees have been required to manually clean these filters. In most cases, these lost time accidents have led to decisions to discontinue the use of the filter.

Various tube and cartridge type filters can be used. Although they are technologically feasible, they are not economically attractive because of the necessity of cleaning them manually on a peridic basis and the potential exposure to dangerous safety conditions.

During the filtering operation, an additional aspect comes into consideration: cleaning the filtering or straining devices after a filtration cycle has been completed. The currently used technique provides for backflushing of filter or strainer elements by simply reversing the flow of fluid through the filter element. This method does not allow for suitable cleaning of the filter element, since a high level of contaminants is deposited on the exterior of the filter and simple backflushing by reversing of flow does not dislodge the settled cake.

Another problem exists during straining. When straining the white water through 0.0004 (100 microns) slots, a considerable amount of fiber passes through the "clean side". When backflushing with this water, some of this fiber becomes lodged on the inside of the screens on conventional designs.

It is therefore clearly seen that there exists a necessity to provide an efficient device for filtering fluids, such as white water, and reclaiming substantially all fiber solids and clean water in one device.

SUMMARY OF THE INVENTION

The present invention solves the problems and shortcomings of the present state of the art in a simple and straightforward manner.

A system is provided for filtering fluids and filter elements, such as utilized in a paper making industry, specifically white water. The system is designed to operate in the place of a save-all device or downstream from a save-all device. The system provides for utilization of a filter element comprising a hollow conduit having an interior and a substantially smooth exterior surface. The conduit is formed by a wedge wire wound in a helical fashion with coils secured in the helical relationship by axial braces attached to the wire on the interior of the conduit. The wire is wound in such a manner that the apex of the wedge is directed towards the interior of the conduit, with the flat portion of the wedge forming the exterior of the filter element. One or more of such filter elements are mounted within a filtration vessel and the effluent is withdrawn from the interior of the filter element.

The filter media utilized in the present invention is found in the usual paper making process and is introduced as part of an incoming fluid into the strainer or filtration vessel.

In order to clean the filter elements, a backflush reservoir is provided, the reservoir being at least partially filled with backflushing liquid, such as for example, water, with the remainder of the space being occupied by pressurized air.

The backflush reservoir is open for fluid communication with the interior of the filter elements and a relatively large amount of fluid, be it water or just air, is introduced for a very brief period of time into the filter element, creating a backflushing pressure shock and dislodging all sediment accumulated on the exterior of the filter element.

The pressure level of the backflushing fluid should be at least slightly above the level of pressure differential across the filter element.

In order to prevent the filter media from forming a dense cake on the exterior of the filter element, a polymer can be introduced along with the incoming fluid to break the adhesion of the fibers to each other and make the cake more porous, thus extending the filtration cycle prior to backflushing.

The effluent from the filter element contains virtually no fiber or solids in the form of chemical compounds used in the paper industry or pieces of bark or dirt, making the effluent suitable for reuse in the paper making process or for disposal, as desired.

It is therefore an object of the present invention to provide a filtration system for filtering fluids and reclaiming the solids and clean water.

It is a further object of the present invention to provide a filtration system for use in the paper making industry for treating white water in place of a save-all device or downstream from a save-all device.

It is another object of the present invention to provide a method of backflushing a filter element and dislodging all solids which accumulate on the exterior of the filter element.

It is a further object of the present invention to provide an apparatus and process for filtering fluids, wherein virtually all solids and contaminants are removed from the effluent.

These and other objects of the present invention will be apparent to those skilled in the art from the following description of the present invention.

DETAILED DESCRIPTION OF THE PREFERRED EMBODIMENT

Reference will now be made to the following description of the preferred embodiment in conjunction with the accompanying drawings, wherein numeral 10 designates a filtration system in accordance with one embodiment of the present invention. The system 10 is designed for use in place of a currently known save-all device, providing treatment of white water collected in the paper making process from the forming screen or from other devices during the steps of a paper making process.

Figure 1:
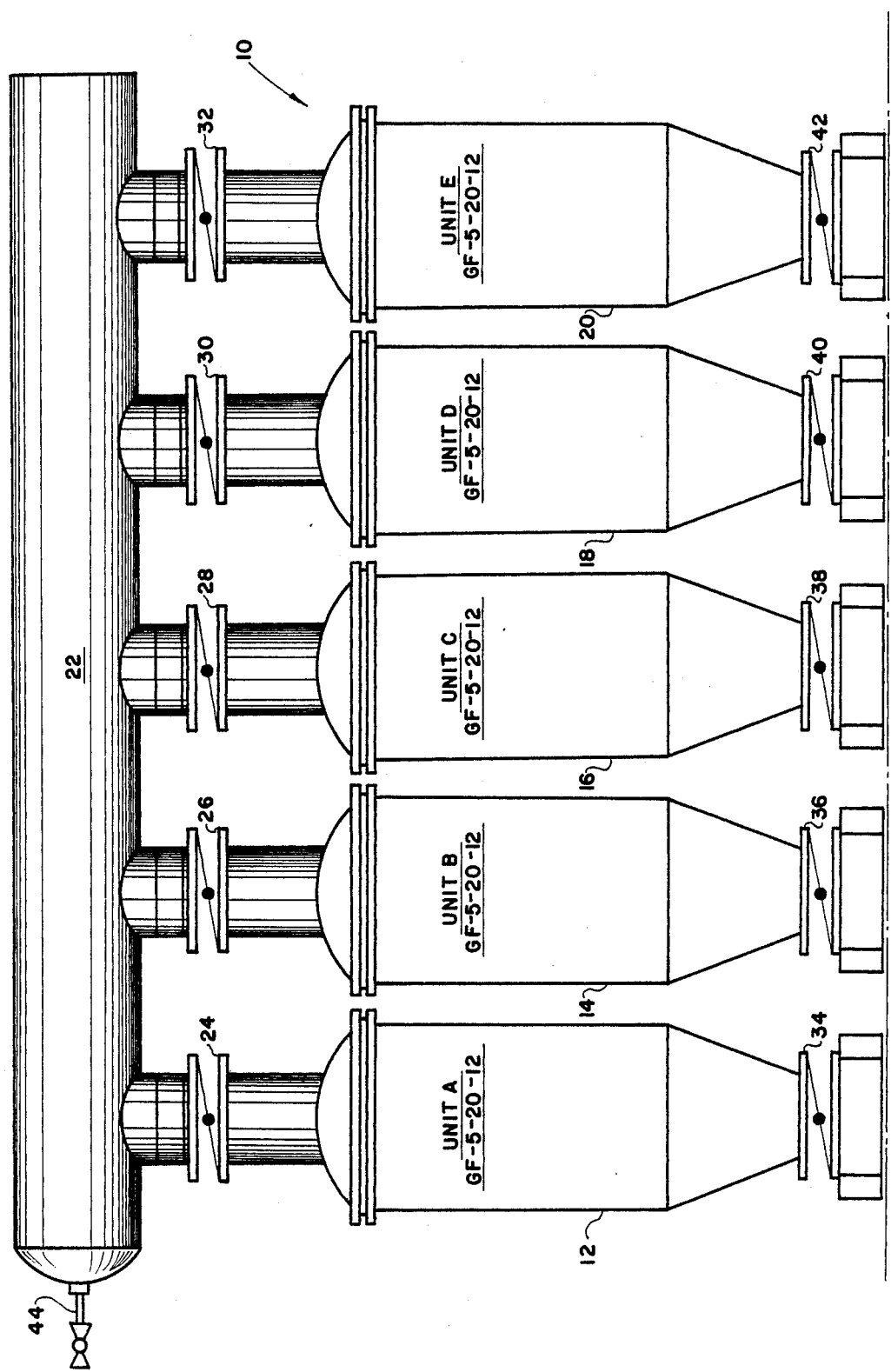
FIG. 1 is a schematic diagram of a filtration system in accordance with the first embodiment of the present invention.

As shown in FIG. 1, the system 10 provides for the use of a number of filtration units, although the number of filtration units will largely depend on the amount of fluid to be processed and the required quantity of effluent.

In the exemplary embodiment shown in FIG. 1, filtration units 12, 14, 16, 18 and 20 are shown mounted side-by-side, each of the filtration units being in the general cylindrical form mounted in a vertical orientation. A backflush reservoir 22 is mounted in fluid communication with all filtration units 12-20, with the communication being established between the reservoir 22 with the top portion of the filtration units: through valve 24— to filtration unit 12, valve 26—to filtration unit 14, valve 28—to filtration unit 16, valve 30—to filtration unit 18 and valve 32—to filtration unit 20.

Suitable discharge of collected contaminated solids is provided at the bottom of every filtration unit: discharge valve 34—for filtration unit 12, valve 36—for filtration unit 14, valve 38—for filtration unit 16, valve 40 for filtration unit 18 and valve 42—for filtration unit 20.

The backflush reservoir can be partially filled with water, with the remainder of the space being occupied by a gas, such as air under pressure. Alternatively, the backflush reservoir can be filled with air through an appropriate air inlet 44.

The backflush reservoir will be filled with pressurized air only in case if dry cake discharge is desired. In case of a wet cake discharge provision of a liquid, such as water in the backflush reservoir is necessary.

The pressure within the backflush reservoir 22 can vary depending on the size of a filter element or elements, positioned within the filtration units but it was found that a pressure of approximately 8 atmospheres is sufficient for standard applications.

Figure 2:
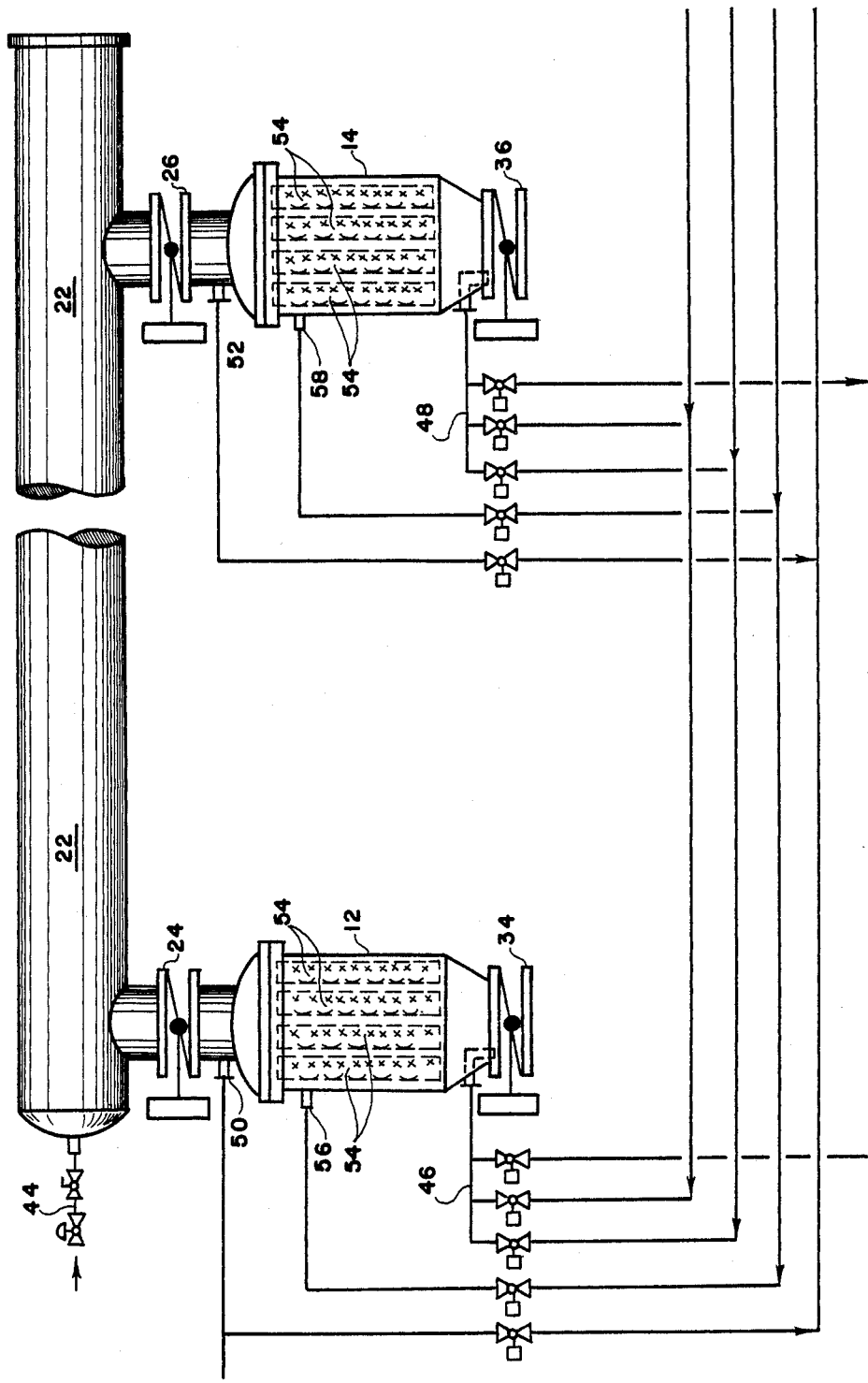
FIG. 2 is a schematic diagram showing a system with two filtration units in operation.

FIG. 2 illustrates in more detail the flow arrangement in a system with, for example, two filtration units 12 and 14 mounted in fluid communication with the backflush reservoir 22.

Each filtration unit 12 or 14 is individually connected to an inlet line 46 and 48, respectively, for delivering contaminated fluid having suspended solids into the interior of the filtration vessels.

Suitable outlet lines 50 and 52 for effluent, or filtrate, are provided at the upper portion of the filtration units 12 and 14.

Mounted within the filtration units are filter elements 54 extending substantially in parallel relationship to a vertical axis of the filtration units. The filter elements 54 are similar to the filter elements disclosed in our U.S. Pat. No. 4,704,210 issued on Nov. 3, 1987, wherein each filter element comprises a hollow conduit having an interior and a substantially smooth exterior surface. The conduit is formed by a wedge wire wound in a helical fashion with coils secured in the helical relationship by axial braces attached to the wire on the interior of the conduit. The wire is wound in such a manner that the apex of the wedge is directed towards the interior of the conduit, and the flat portion of the wedge forms the exterior of the filter element. The distance between the coils of the wire can vary from 25-200 microns, or even greater, which will largely depend on the intended use of the effluent and on the character of the fluid to be treated, as well as the amount of contaminants suspended in the inflow delivered into the filtration vessels.

Air can be introduced into the filtration vessel during filtration operation to assist in a more active distribution of the filtered media within the vessel and a suitable conduit 56 and 58 is provided for the units 12 and 14, respectively.

The fluid having suspended solids in the form of fiber, chemical compounds, including titanium dioxide and other additives, is introduced into the filtration vessel through inlet lines 46 and 48. The white water contains a considerable amount of fiber suspended therein and relatively fast a layer of fiber is formed on the exterior of the filter elements. This layer forms a pre-coat layer which will subsequently assist in filtering other contaminants from the fluid.

There exists a tendancy in fiber found in pulp to create a dense cake on the filter elements under the pressure which moves the fluid into the filtration vessel. To prevent formation of a non-penetratable layer, a polymer can be added, which breaks the adhesion of the fibers and creates a more porous filter media outside of the filter elements. The fluid which penetrates into the interior conduit formed by the filter element is virtually free of contaminants found in white water and flows, under the pressure of incoming fluid, upwardly through the filter element and to the upper portion of the vessel from hence it is withdrawn through the outlet lines 50 and 52.

The layer which formed on the filter element now contains fiber and chemical additives which gradually build up on the exterior of the filter element, creating a pressure differential between the exterior and interior of the filter element. A suitable material is selected for the filter elements which have to withstand high pressure applied during filtering operation, especially when the build-up on the filter elements reaches a considerable level. This pressure tends to deform the filter elements and to prevent deformation, the filter elements are preferably made of stainless steel or for example, high impact plastic, or any other material which is compatible in its physical characteristics.

In time, the layer which accumulates on the exterior of the filter element causes pressure differential to reach the level when the filtration process can no longer be continued and the filter element needs to be cleaned.

The inlet flow is interrupted and valves leading from outlets 50 and 52 are closed. Valves 24 and 26 are then opened allowing the backflush fluid to enter the filter elements 54 from the interior thereof. A backflush shock is created, allowing the backflush reservoir 22 to be emptied within a relatively brief period of time, 1-2 seconds, and this combination of a large amount of pressurized backflush fluid delivered through the filter elements in a brief period of time causes the cake settled on the exterior of the filter elements 54 to be dislodged and dropped by gravity to the bottom of the filtration vessels 12 and 14.

It was found that the pressure level of the backflush fluid should be at least slightly above the level pressure differential across the filter elements.

The valves 34 and 36 are then opened allowing a wet cake discharge, if the backflush reservoir 22 was at least partially filled with water, and dry cake discharge, in case if the backflush reservoir was filled with air under pressure only.

The discharged cake contains practically all fiber which entered the filtration vessels 12 and 14 in combination with chemical compounds which were suspended in the inflow. The filtrate leaving the filtration vessels 12 and 14 is suitable for reuse at any step of the paper making process, since it is fiber free or even suitable for disposal under current environmental protection laws. The discharge cake can be directed toward a reservoir for recirculation of the chemical compounds in the system, with the fiber suitable for being added to the incoming pulp and for other necessary applications.

Figure 3:
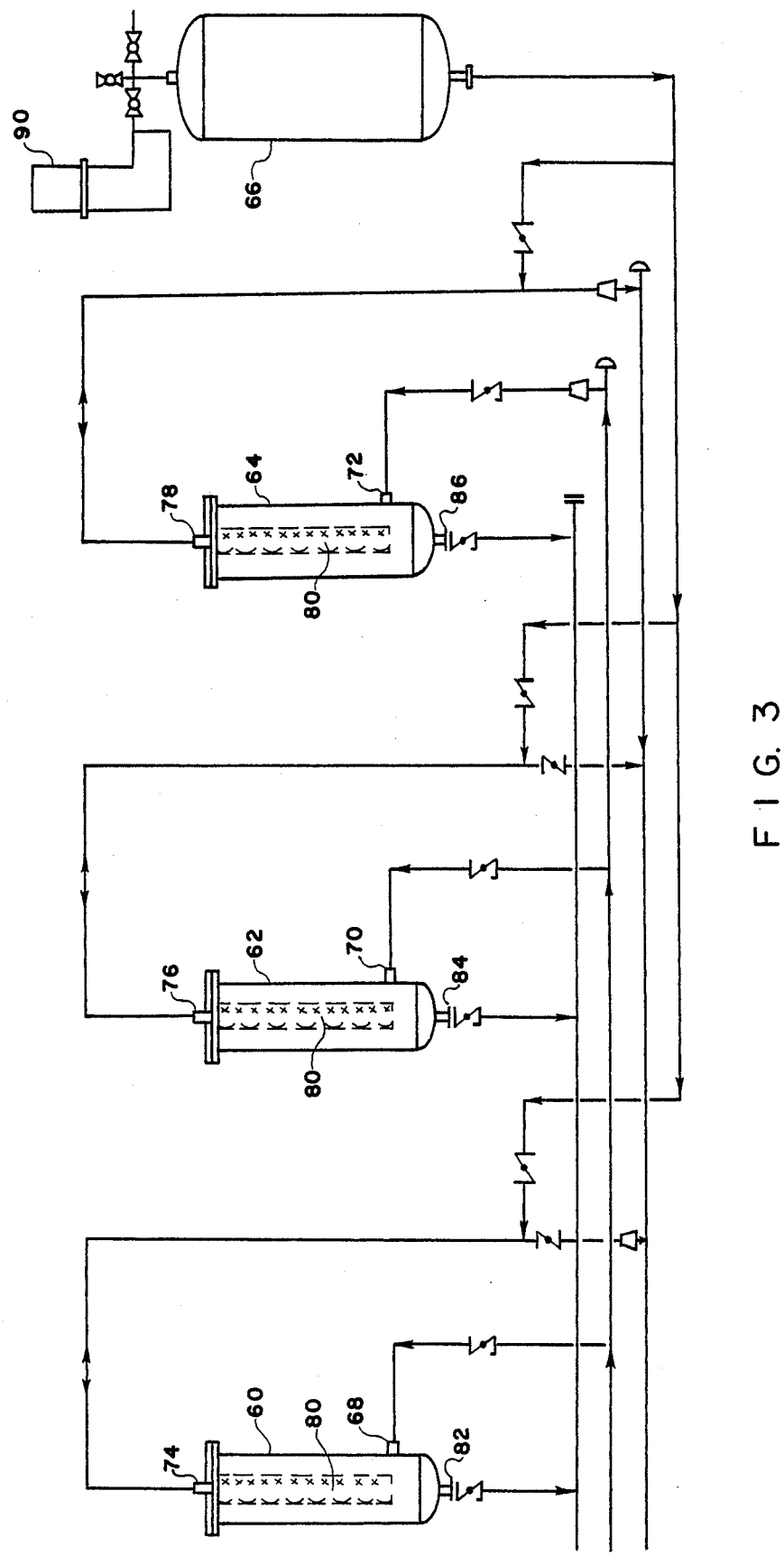
FIG. 3 is a schematic diagram of a second embodiment of the present invention wherein the filtration units are used downstream from an existing save-all device.

FIG. 3 illustrates, in schematic form, the flow diagram of a second embodiment of the system in accordance with the present invention wherein the filtration system is positioned downstream from the save-all device.

As was noted before, the save-all device is not 100% effective and a considerable amount of fiber is still present in the effluent after treatment in a save-all device. To correct this, the present filtration system can be positioned downstream of the save-all device to receive its effluent and to render it suitable for recirculation in the paper making process.

As shown in FIG. 3, the system is provided with a plurality of filtration vessels, for example, three strainer vessels 60, 62 and 64 are mounted side-by-side with a backflush reservoir 66. Each filtration unit is provided with an inlet line for delivering effluent from a save-all device: with an inlet line 68—to filtration unit 60, inlet line 70—to filtration unit 62 and inlet line 72—to filtration unit 64. An outlet line for each filtration unit is connected to the upper portion of the filtration units 60-64, with the lines 74, 76 and 78 leading from the filtration units 60-64, respectively.

The outlet lines are connected with the interior of the filter elements 80 suspended within the filtration units 60-64. A bottom portion of each filtration unit 60-64 is provided with a suitable discharge valve for allowing cake discharge from the filtration units. The cake discharge valve 82 leads to the discharge line from the filtration unit 60, valve 84 is attached to the filtration unit 62 and valve 86 is mounted in fluid communication with the filtration unit 64.

Similar to the operation of the embodiment shown in FIG. 2, the filter elements 80 extend substantially through the length of the filtration units 60-64, and the inflow of fluid deposits a thin precoat layer of fibrous matter on the exterior of the filter elements. The precoat layer serves as an initial filter media for incoming fluid within the filtration vessels.

Gradually, a thick layer deposits on the filter elements and to prevent a dense cake formation, a polymer can again be introduced through the inlet lines 68-72 into the filtration vessels, making the cake more porous and suitable for a prolonged filtration process within the units.

Gradually, the pressure differential between the interior of the filtration vessel and interior of the filter element builds up and when it reaches a predetermined level, which is detected by a control panel 90, the flow of media to be filtered is interrupted and the valves leading to inlets 68-72 are closed. The valves serving outlet lines 74-78 remain open to receive a backflush shock from the backflush reservoir 66. Similarly to the first embodiment of the present invention, the backflush reservoir can be partially filled with water, with the remainder of the space being occupied with pressurized air, so that as soon as the valves leading from the backflush reservoir 66 are open, a considerable amount of fluid under pressure is forced into the filter elements 80, forcing the matter settled on the exterior of the filter elements 80 to be dislodged and dropped by gravity to the bottom of the filtration units 60-64. The backflush shock is applied for a very brief period of time, 1-2 seconds, emptying the backflush reservoir 66 through the filter elements 80.

The cake discharge is subsequently initiated allowing the solids, in the form of a slurry or a dry cake, to be discharged through discharge valves 82, 84 and 86 and withdrawn from the system for recirculation in the paper making process or for disposal, as need be.

As a result, the system of the present invention accomplishes the goal of cleaning, filtering the contaminated fluid, for example, white water of all impurities introduced into the fluid during the paper making process. Application of a backflush shock to the filter elements solves the problems of cleaning the filter elements in a simple, inexpensive manner, saving the time for which the filtration units must be withdrawn from the filtration process and cleaned. The cost of filtration is thereby significantly reduced, affording advantages to the system not known heretofore in the art.

Many changes and modifications in the above-described embodiments of the invention can be carried out without departing from the spirit and scope thereof. We therefore pray that our rights to the present invention be limited only by the following claims.

I claim:

1. A process of filtering a fluid having suspended contaminants, comprising the steps of:
   providing a filtration vessel having at least one filter element mounted therein, the filter element having an interior and an exterior;
   providing means for delivering the fluid to be filtered into the filtration vessel;
   introducing a flow of the contaminated fluid into the filtration vessel;

forming a layer of filter media on the exterior side of the filter element;

removing filtrate from the interior of the filter element and delivering it outside of the filtration vessel;

detecting a pressure differential of a predetermined value across the filter element;

interrupting a flow of contaminated fluid into the filtration vessel and a flow of filtrate out of the vessel;

providing a backflushing reservoir containing a pressurized backflushing fluid;

providing a normally closed valve means preventing fluid communication between the filtration vessel and the backflushing reservoir during filtration process;

opening the valve means and allowing the pressurized backflushing fluid to enter the interior of the filter element;

backflushing the filter element by a fluid pressurized to a level at least slightly above a level of pressure differential across the filter element at a velocity sufficient to create a backflushing shock capable a dislodging the comtaminants which formed a layer on the exterior of the filter element; and removing the dislodged contaminants from the filtration vessel.

2. The process of claim 1, wherein backflushing fluid is pressurized to about eight atmospheres.

3. The process of claim 2, wherein the step of forming a layer of filter media comprises a step of forming a pre-coat layer which comprises solids delivered into the filtration vessel as part of the contaminated fluid.

4. The process of claim 1, wherein the backflushing reservoir is at least partially filled with a backflushing liquid.

5. The process of claim 4, wherein the backflushing reservoir further contains a gas under pressure.

6. The process of claim 1, wherein the backflushing reservoir is filled with a pressurized gas.

7. The process of claim 1, wherein the backflushing shock continues for a period of 1-2 seconds.

8. An apparatus for filtering a contaminated fluid, comprising:

a vessel having a filtration space therein;

means for introducing a contaminated fluid into the vessel;

at least one filter element having an interior and an exterior mounted inside the vessel;

means for removing filtrate from the interior of the filter element;

means for introducing a backflushing shock into the interior of the filter element for dislodging a layer of contaminants settled on the exterior of the filter element;

means for preventing fluid communication between the vessel and the means for introducing the backflushing shock during a filtration process, said means for preventing fluid communication comprising a normally closed valve means, which opens to introduce the backflushing shock into the interior of the filter element; and means for removing the dislodged contaminants from the vessel.

9. The apparatus of claim 8, wherein the means for introducing the backflushing shock comprise a backflushing reservoir at least partially filled with the backflushing fluid under pressure.

10. The apparatus of claim 9, wherein the backflushing reservoir is pressurized to about 8 atmospheres.

11. The apparatus of claim 9, wherein the means for introducing the backflushing shock are adapted for applying the backflushing shock for a period of 1-2 seconds.

12. The apparatus of claim 9, wherein the backflushing reservoir is filled with a pressurized gas.

13. The apparatus of claim 9, wherein the backflushing reservoir is at least partially filled with a liquid.

14. The apparatus of claim 13, wherein the backflushing reservoir further contains a pressurized gas.

* * * * *